(12) United States Patent
Shemer et al.

(10) Patent No.: US 10,860,608 B2
(45) Date of Patent: Dec. 8, 2020

(54) ANY POINT IN TIME REPLICATION TO THE CLOUD

(71) Applicant: EMC IP Holding Company LLC, Hopkinton, MA (US)

(72) Inventors: Jehuda Shemer, Kfar Saba (IL); Kfir Wolfson, Beer Sheva (IL); Itay Azaria, Beer Sheva (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 180 days.

(21) Appl. No.: 16/170,809

(22) Filed: Oct. 25, 2018

(65) Prior Publication Data

US 2020/0134079 A1 Apr. 30, 2020

(51) Int. Cl.
*G06F 16/27* (2019.01)
*G06F 16/215* (2019.01)

(52) U.S. Cl.
CPC ........... *G06F 16/27* (2019.01); *G06F 16/215* (2019.01)

(58) Field of Classification Search
CPC ............ G06F 11/2069; G06F 11/1448; G06F 16/907; G06F 3/0608; G06F 3/0604; G06F 16/2365; G06F 16/183; G06F 16/27; H04L 67/10
See application file for complete search history.

(56) References Cited

U.S. PATENT DOCUMENTS

| 7,890,715 | B2* | 2/2011 | Burr | G06F 11/2069 |
| | | | | 711/161 |
| 8,819,362 | B1* | 8/2014 | Duprey | G06F 11/2069 |
| | | | | 711/161 |
| 9,087,008 | B1 | 7/2015 | Natanzon | |
| 2009/0177661 | A1* | 7/2009 | Sandorfi | G06F 11/1448 |
| 2018/0025021 | A1* | 1/2018 | Jain | G06F 16/183 |
| | | | | 707/626 |
| 2018/0067951 | A1* | 3/2018 | Brandwine | G06F 16/907 |
| 2018/0121129 | A1* | 5/2018 | Sawhney | G06F 3/0604 |
| 2018/0210793 | A1 | 7/2018 | Mamluk | |
| 2018/0295206 | A1* | 10/2018 | Devaraju | H04L 67/10 |
| 2019/0121705 | A1* | 4/2019 | Mayo | G06F 16/2365 |
| 2019/0129844 | A1* | 5/2019 | Zhang | G06F 3/0608 |

FOREIGN PATENT DOCUMENTS

EP 3125119 2/2017

OTHER PUBLICATIONS

Invitation to Pay Fees issued in Application No. PCT/US2019/041118 dated Oct. 9, 2019.

* cited by examiner

*Primary Examiner* — Etienne P Leroux
(74) *Attorney, Agent, or Firm* — Workman Nydegger

(57) ABSTRACT

Systems, apparatus, and methods for any point in time replication to the cloud. Data is replicated by replicating data to a remote storage or a data bucket in the cloud. At the same time, a metadata stream is generated and stored. The metadata stream establishes a relationship between the data and offsets of the data in the production volume. This allows continuous replication without having to maintain a replica volume. The replica volume can be generated during a rehydration operation that uses the metadata stream to construct the production volume from the cloud data.

17 Claims, 5 Drawing Sheets

US 10,860,608 B2

ANY POINT IN TIME REPLICATION TO THE CLOUD

FIELD OF THE INVENTION

Embodiments of the present invention relate to systems, apparatus and methods for replicating data to the cloud and to restoring data. More particularly, embodiments of the invention relate to systems and methods for performing any point in time replication to a storage location such as the cloud or a datacenter. Embodiments of the invention further relate to continuous replication without having to maintain a replica volume in the cloud.

BACKGROUND

Data protection is the process by which an entity protects its data. Data is often protected, for example, by creating backups. By performing a backup operation to create a backup, the entity is able to restore their production data from a backup copy in the event of loss.

Data protection systems are often associated with a recovery point objective (RPO). The RPO can be expressed in many ways, but generally refers to the point in time to which the data can be recovered. For example, an RPO of an hour means that if something happens to the production data, the entity will likely have lost an hour's worth of data.

Instead of backing up data locally, some entities may choose to replicate their data to the cloud. This is often performed using snapshot based methods. However, the RPO of snapshot based systems is often unsatisfactory. More specifically, the RPO in snap-based applications is limited. Restores can only be performed to the most recent snapshot, which may be a few minutes or hours in the past.

In addition, conventional mirroring, as done in tier-1 replication, requires compute resources on the remote site in order to process the data and maintain the replica or mirrored volume.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
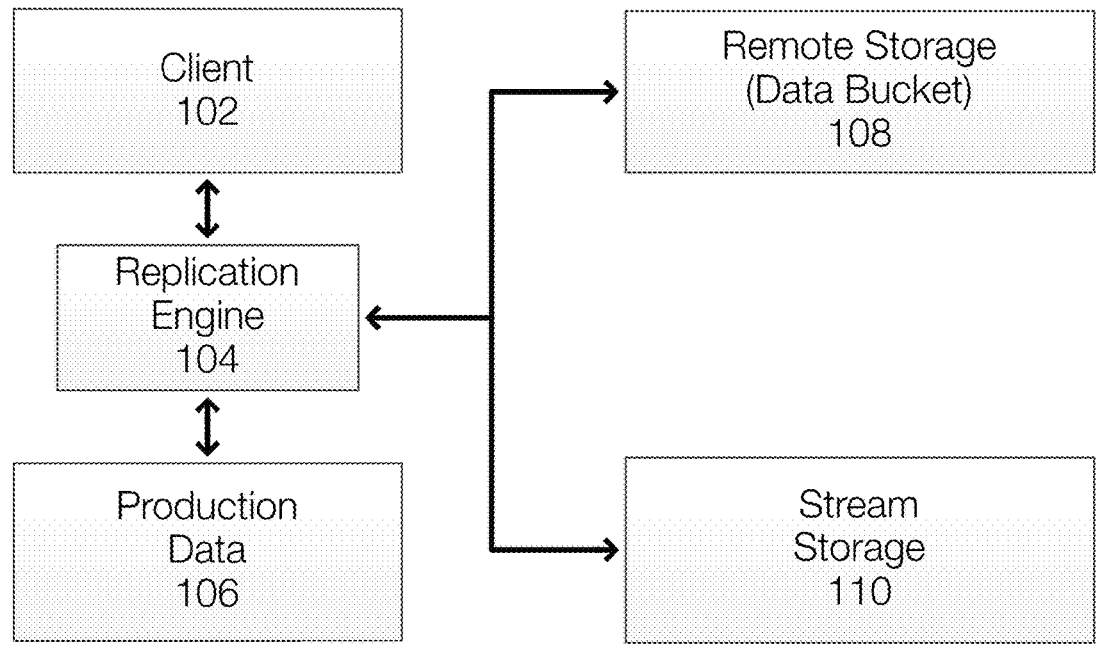
FIG. 1 illustrates an example of systems, apparatus, and methods for replicating data in the cloud.

Embodiments of the invention relate to systems, apparatus and methods for protecting data. More particularly, embodiments of the invention relate to data protection operations which may include, but are not limited to, backup operations, replication operations, restore operation, rehydration operations, deduplication operations, metadata operations, or the like or combination thereof.

Embodiments of the invention relate to data protection systems, apparatus and methods that allow data to be protected in the cloud (e.g., a datacenter) while achieving an RPO of seconds and with an any point in time granularity. Embodiments of the invention can also be applied in the context of local backups. To achieve any point in time granularity and an RPO of seconds or lower, embodiments of the invention replicate production data to an object store (the cloud) and generate a metadata stream. The metadata stream stores relationships between the replicated data and the production volume.

By applying the metadata stream to the cloud data, the production data can be restored to any point in time. In one example, by continuously replicating the data and by providing the metadata stream, embodiments of the allow (for a continuous replication system) the cloud data to be stored in storage other than tier 1 storage. Further, compute resources, in one embodiment, may only be needed when a restore is required. In other words, it may only be necessary to write data to the cloud when protecting the data in a continuous manner. The storage requirements can also be reduced by performing deduplication operations.

In embodiments of the invention, continuous replication involves mirroring or replicating each IO (input/output) on a production data (a production volume) to a remote site. The replicated or mirrored data can be stored as objects in a data bucket. Replicating data to a remote site can achieve near zero RPO.

The disadvantage of conventional mirroring is that tier 1 storage is often required. In addition, compute time is required at the remote site in order to process the data and maintain the replica volume. Embodiments of the invention are able to replicate data, continuously in one example, and achieve near zero RPO without having to maintain a replica volume. Rather, compute time may only be needed during a restore or rehydration operation.

Data can be stored in a data center in different ways including object storage, file storage, and block storage. The term data or object is used herein and the disclosure can also be performed with files or blocks or other data storage configuration. In the context of object based storage, each object may include, by way of example, data, a variable amount of metadata, and/or a globally unique identifier Embodiments of the invention provide continuous replication of production data to a remote site such as a datacenter or cloud storage (also referred to herein as a data bucket in which data is deposited).

Continuous Replication Using a Metadata Stream

FIG. 1 illustrates an example of a computing environment in which data protection operations are performed. FIG. 1 illustrates a client 102 that is associated with production data 106 (e.g., a production volume). The client 102 may be a virtual machine, a computing device such as a computer, laptop, tablet, smartphone, a server computer or the like. The production data 106 may reside on a storage device (a storage array or other storage arrangement). The production data 106 may be local to the client 102 (e.g., in the same network) or remote from the client 102. The production data 106 may also be cloud based storage.

The client 102 interacts with the production data 106 and may write data or read data or perform other action. Input/Output (IO), in the context of protecting data or in data replication, IOs may refer to actions or commands that result in changes to the production data 106. Whenever data is written (deleted, moved, modified, copied, etc.) to the production data 106, the replication engine 104 replicates the data. More specifically, the replication engine 104 may replicate the action. The replication engine 104 may be incorporated into the production data 106, may be a server or other appliance, or a software layer that is configured to detect certain commands including writes and replicate the data accordingly.

In this example, the replication engine 104 thus replicates or writes the data to remote storage 108, which may be a datacenter, cloud storage, or the like. The replication engine may also generate a metadata stream and write the metadata stream to a remote metadata stream storage 110. The stream storage 110 may be in the same location (e.g., same storage system, same datacenter) as the remote storage 108. The stream storage 110 and the remote storage 108 can also be separate storages.

Figure 2:
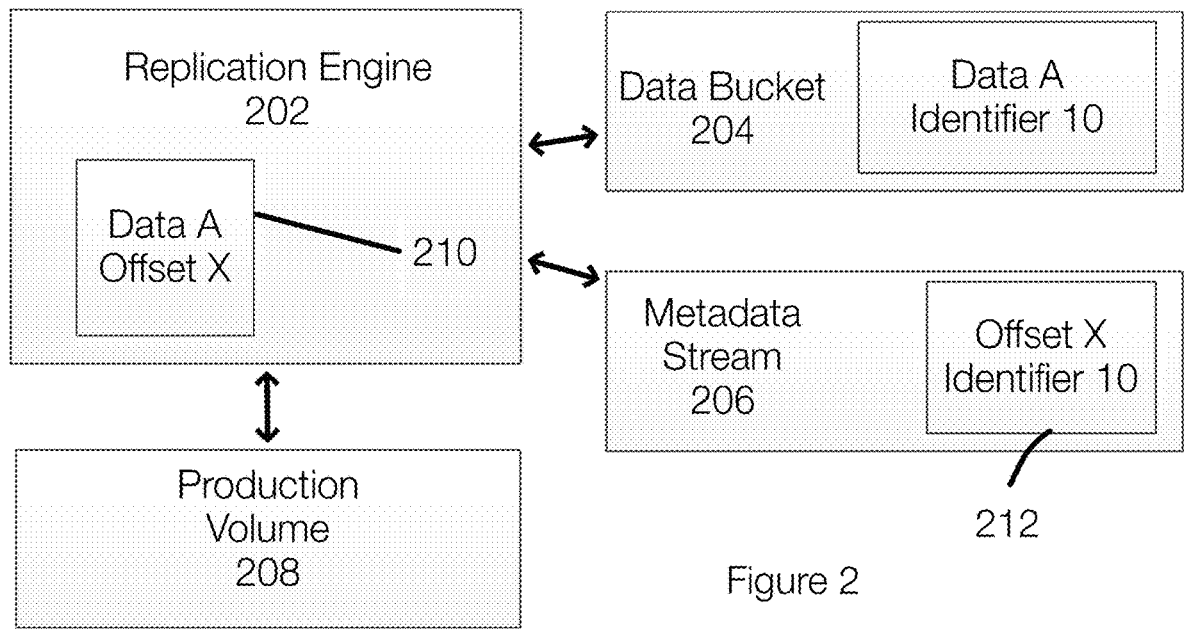
FIG. 2 illustrates and example of systems, apparatus, and methods for replicating data in the cloud by storing objects in a data bucket and maintaining a metadata stream for the objects.

FIG. 2 further illustrates the replication shown in FIG. 1. In one example, the replication engine 202 (an example of the replication engine 104) may detect an IO 210 that is being written to the production volume 208, which may store the production data 106. The replication engine 202 may determine that the IO 210 includes data A and is being written to a location identified as offset X. The offset X is representative of the location of the data A in the production volume 208 or in the production data 106. The offset X may be specified in other terms that may depend on the configuration of the production volume 208

The replication engine then replicates the IO 210 to the data bucket 204, which is an example of the remote storage 108. In one example, the data bucket 204 is a key value type storage. Thus, the replication engine 202 can provide the data bucket 204 with data A and a key such as the identifier 10 and the IO 210 will be stored in the data bucket 204. To retrieve the data A, the data bucket is provided with the identifier 10. Using the identifier 10, the data bucket 204 can retrieve and return the data A.

While replicating the IO 210 or the data A to the data bucket 204, the replication engine 202 may also generate a metadata stream 206 (or an entry in the stream for each IO) that, when transferred, is stored in the stream storage 110. The metadata stream 206 typically includes metadata associated with each IO such as the IO 210. In this example, the entry 212 in the metadata stream 206 for the IO 210 includes the offset X and the identifier 10. The offset X included in the metadata stream 206 refers to the offset in the production volume 208. This information allows the production volume to be restored if necessary as described in more detail below.

In addition, replicating the IOs of the computing system in this manner allows for a near zero RPO to be achieved without having to maintain a replica volume at the cloud, thus saving compute resources. Also, embodiments of the invention allow point in time recovery. In one example, the point in time recovery is typically tied to a particular IO in part because the metadata stream 206 is related to the IOs that occur at the production volume 208. By identifying a time or an IO, embodiments of the invention allow the production volume to be restored to that point in time or to that specific IO.

In one example, the data associated with each IO is on the production volume 208 is stored as an object in the data bucket 204. For example, the IO 210 may be divided into 8 KB chunks. Embodiments of the invention contemplate variable sized blocks. However, fixed size objects require less processing overhead, including inherent handling of IO overlapping. The actual size of the chunk or object is typically a small number (e.g., 4 KB, 8 KB). Even though a larger object size may require fewer uploads, a larger size object may also require completing the object or block if only a portion of the object or block was written to. Also, tracking the areas that are written to in larger size blocks or objects increases the complexity.

Thus, FIG. 2 illustrates that during replication, including continuous replication, the data A may be stored as an object A. More specifically, the data A may actually be chunked into chunks A1, A2, etc. Thus, objects A1, A2, etc., will be stored in the data bucket 204 and each chunk will have its own identifier. The metadata stream 206 stores relationships between the identifiers (which allow the corresponding objects in the data bucket 204 to be identified and retrieved) and the offset in the production volume. During a restore, offsets and identifiers in the metadata stream allows the objects to be retrieved and written to the appropriate offset in the production volume, thus restoring the production volume.

Because the data is chunked before storing the in the data bucket, the ability to restore objects based on offsets effectively restores the data once all of the chunks have been restored.

Figure 3:
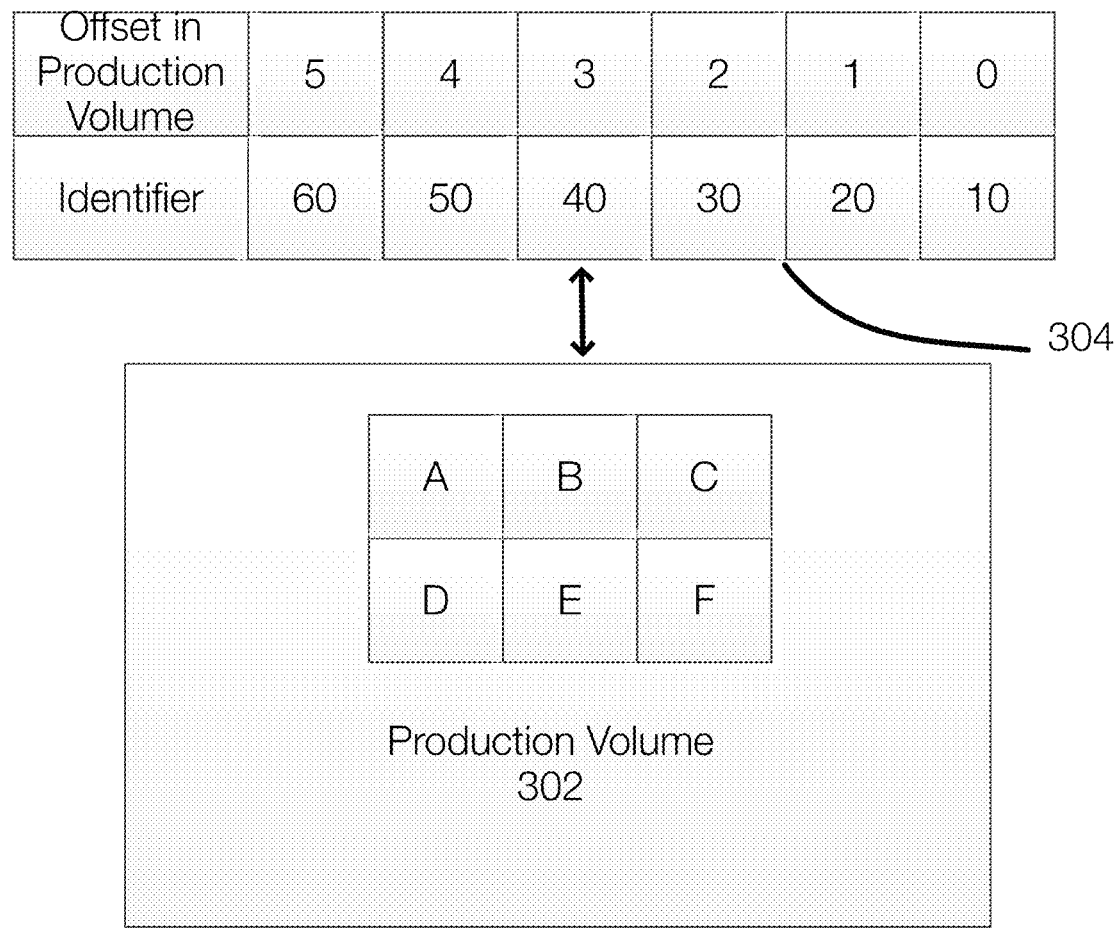
FIG. 3 illustrates an example of a relationship between a metadata stream and a production volume and/or to the objects stored in the cloud.

FIG. 3 illustrates, more specifically, an example of a relationship between a metadata stream and a production volume. FIG. 3 illustrates a metadata stream 304 that is associated with a production volume 302. The metadata stream 304, in one example, is a sequence of IO metadata or a sequence of entries where each entry corresponds to an IO. The entries in the metadata stream 304 are related to data stored in the production volume 302. Each entry stores an offset in the production volume and an identifier. The entries in the metadata stream relate to the data after the data is chunked. Thus, the offset 0 and identifier 10 correspond to the data A (or object A) in the production volume 302. Thus, the data A is located at an offset of 0 in the production volume 302. Similarly, objects B, C, D, E, and F are located, respectively, at offsets 1, 2, 3, 4 and 5 and have identifiers 20, 30, 40, 50 and 60. The identifiers can be any data that represent the corresponding data. Typically, the identifier uniquely identifies the data. For example, the identifiers may be a hash of the corresponding data (object, block, etc.). The identifier may also be used to deduplicate the data.

Figure 4:
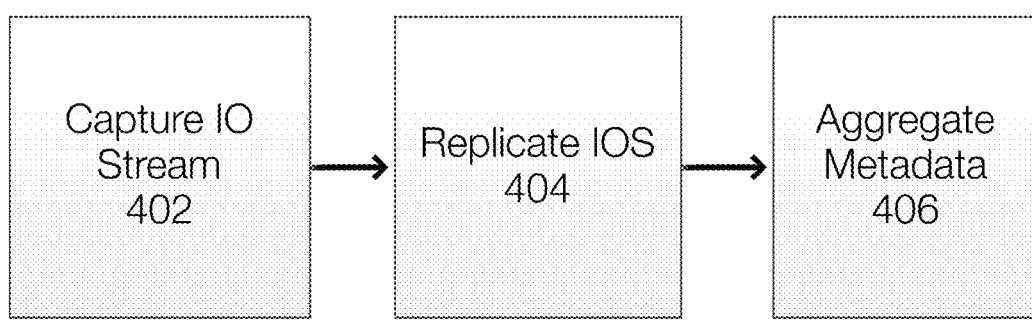
FIG. 4 illustrates an example of a method for replicating production data.

FIG. 4 illustrates an example of a method for performing a data protection application such as data replication. In one example, the method may be performed by a replication appliance or other server or device. In FIG. 4, an IO stream is captured 402. The IO stream is captured continuously and is an example of continuous replication. For example, when data is written to the production volume, the IO is captured.

Next, the IOs are replicated 404. A replication appliance or a replication engine may chunk the data associated with the IOs into chunks. As previously stated, these chunks may have a predetermined size. In one example, the IOs are chunked into 8 KB chunks. The replication appliance then uploads the chunks to the data bucket as objects. The objects are then stored in the data bucket. In one example, the objects are stored in the data bucket using a key-value arrangement.

Next (or at substantially the same time), metadata associated with the objects or IOs is aggregated 406 and stored in a metadata stream. Thus, the metadata stream, in one example, is a sequential list of IOs that have been captured with respect to the production volume. In one example, the metadata stream is transmitted to the metadata storage based on the size of the metadata stream, based on the desired RPO, and/or based on another threshold. For example, if the size of the metadata stream reaches a threshold size (e.g., 8 KB), the metadata stream is transmitted and stored at the metadata storage. Thus, the metadata stream may also be stored as an object. Alternatively, the metadata stream is transmitted once one-fourth (or other threshold) of the RPO has passed.

FIG. 4 illustrates the ability to continuously replicate a production volume by replicating the data (or objects) to a data bucket and by generating and storing a metadata stream that is associated with the objects written to the data bucket. This further allows continuous replication without having to maintain and consume cloud computing resources to maintain a replica volume in the cloud. Rather, cloud computing sources may only be needed when there is a need to restore or rehydrate the production volume from the backups (the objects stored in the data bucket and the metadata stream).

Production Data Rehydration

A production volume (or production data) can be rehydrated using the objects stored in the remote storage (or data bucket) and the metadata stream stored in the stream storage. Generally, a production volume is rehydrated or restored by creating a blank metadata volume. Once the metadata volume is created, the metadata stream is used to roll the metadata volume to the required point in time by writing identifiers to offsets in the metadata volume. This is achieved by moving forward from the tail of the metadata stream and updating the metadata volume according to each write encountered.

Each entry in the metadata volume points to an IO in the stored objects. Thus, the metadata volume includes entries that each point to an object in the object store in one example. In one example, only the first encountered instance of each IO is updated in the metadata volume. More specifically, the metadata volume is updated with each encountered IO as previously discussed. This allows copying the actual IO data to the restored volume to be avoided if that specific offset is going to be overwritten before required point in time is reached. In one example, as a result, looking at the metadata stream from the required point in time to the tail, only one IO for each offset is copied.

Once the appropriate point in time has been reached in the metadata stream and all of the necessary entries in the metadata stream have been written to the metadata volume, the metadata volume is organized. The actual data has not been moved or copied at this point. Embodiments of the invention, however, contemplate copying data while organizing the metadata volume.

Once the metadata volume has been prepared, the metadata volume and the data bucket can be used to rehydrate the production volume. The rehydrated production volume is a copy of the original production volume (e.g., a virtual machine's disk) at the requested point in time. In one example, actually generating the replica production volume is only required if the resulting replica volume is accessed like a regular volume. If a mediator is present, the metadata volume and the data bucket can be used on demand without the need to copy the user data again. In one example, the metadata volume allows or prevents unnecessary reads with regard to data is going to be overwritten as previously described.

Figure 5:
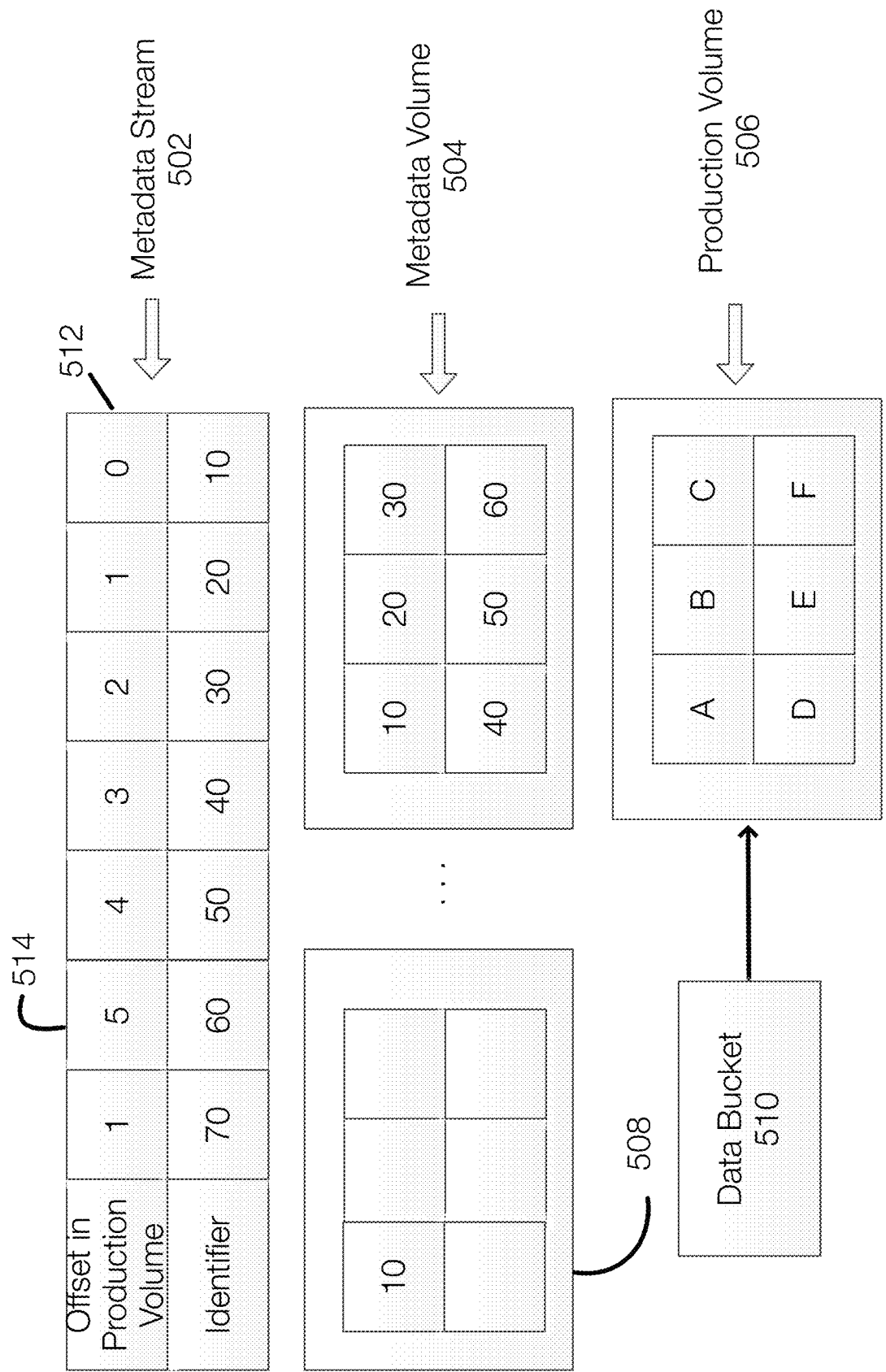
FIG. 5 illustrates an example of systems, apparatus and methods for rehydrating data from a data bucket to a replica production volume.

FIG. 5 illustrates an example of rehydrating a production volume. FIG. 5 illustrates the process of rehydrating a production volume 506 from the metadata stream 502 and the data bucket 510, which are examples of previously described metadata streams and data buckets.

In FIG. 5, the metadata volume 504 is first generated starting, in one example, from a blank metadata volume. In this example, the tail end 512 of the metadata stream 502. is read. The tail end 512 corresponds to an entry in the metadata stream 502. In one example, entry at the tail end is the oldest entry in the metadata stream 502. In this example, new entries are pushed to the head of the metadata stream. However, the metadata stream can be arranged in another manner such that the oldest entry is at the head of the metadata stream. By reading the metadata stream 502 starting with the oldest entry and then proceeding back in time, the metadata volume 504 can be populated with object or data identifiers at offsets that correspond to offsets in the production volume.

In one example, an initialized production volume may be available. This production volume may correspond to a point in time just prior to the oldest entry in the metadata stream. Using the metadata volume, which has been loaded with information from the metadata stream, the initial production volume can be rolled forward to the selected point in time. In one example, the production volume can be generated directly from the metadata stream.

In this example the identifier 10 is copied to a location that corresponds to offset 0. When the time comes to prepare the production volume 504, the identifier in the metadata volume 504 stored at the offset 0 is used to retrieve an object from the data bucket 510 and the object retrieved from the data bucket 510 is then written to the location corresponding to offset 0 in the production volume 506, which may be a replica volume.

More specifically, the metadata stream 502 is read until the point in time 514 is reached and each entry, if necessary, is written to the metadata volume. The point in time 514 is the point in time at which a restore is desired. In this example, there are six entries to be written to the metadata volume 504. Thus, the identifiers 10, 20, 30, 40, 50 and 60 are written to the corresponding locations or offsets stored in the metadata volume 504. This results in the metadata volume 504, which includes identifiers 10, 20, 30, 40, 50 and 60 written at, respectively, offsets 0, 1, 2, 3, 4, and 5.

At this stage, no data has been copied from the data bucket 510 to the production volume 506. However, it is possible to restore or rehydrate the production volume as the metadata volume 504 is being generated.

Once the metadata volume 504 for the point in time 514 is generated, the production volume 506 can be populated with data from the data bucket 501. Because the metadata volume 504 stores identifiers or keys, these identifiers can be used to access the data bucket 510 to retrieve the corresponding objects, which are written to the same or corresponding offset in the production volume 506. Thus, the identifier 10 in the metadata volume 504 is used to retrieve an object A. The object A is then written to offset 0 in the production volume, which corresponds to the identifier 10, which is written to offset 0 in the metadata volume. Once this process is completed, the production volume 506 is ready for use and can be mounted if necessary. The metadata volume 504 can be retained for a time or deleted.

Alternatively, the rehydrated volume or replica volume may not be necessary if there is a mediator. For example, a request for the data at offset 1 may be requested. The mediator may access the metadata volume to determine the identifier at offset 1 and then access the data bucket 510 to retrieve the data corresponding to the retrieved identifier. The retrieved data is then returned to the requestor.

Figure 6:
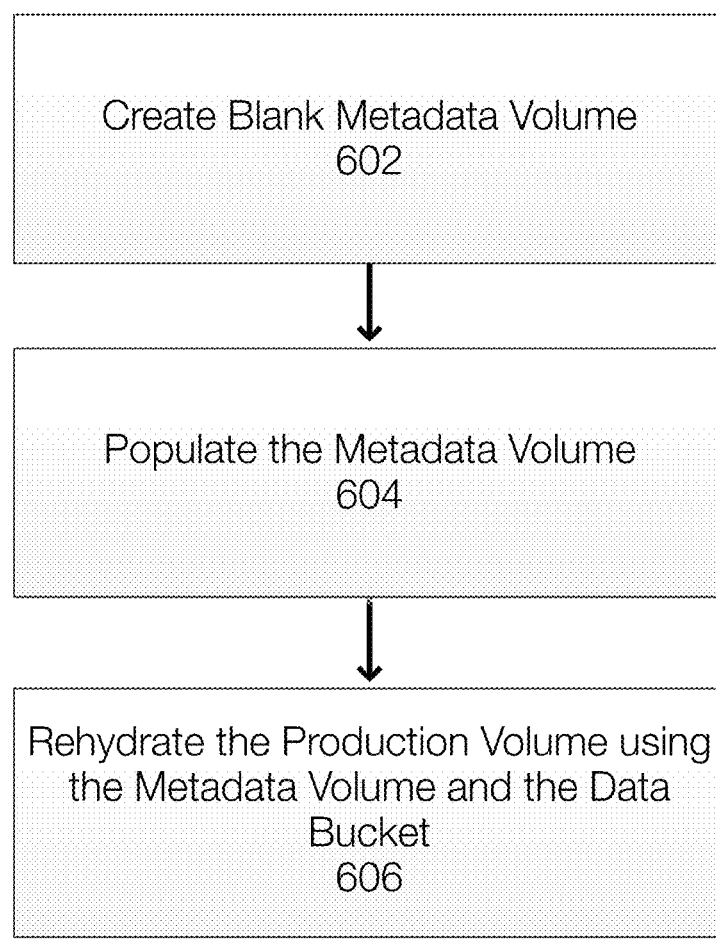
FIG. 6 illustrates an example of a method for rehydrating a production volume using the metadata stream and the data bucket.

FIG. 6 illustrates an example of a method for rehydrating a production volume. Once the rehydration operation is started, a blank metadata volume 602 is created 602. The metadata volume is then populated 604 by rolling the metadata to the required point in time. This may be performed by populating the metadata volume starting with the tail of the metadata stream and updating the metadata volume according to the writes in the metadata stream. This allows the metadata to be organized in the metadata volume.

Next, the metadata volume and the data bucket are used to rehydrate 606 the production volume. In one example. The production volume being hydrated may have an initial set of data stored thereon. The entries in the metadata volume allow objects to be retrieved from the data bucket and written to a specific offset in the production volume. This allows the production volume to be rolled forward to the selected or identified point in time.

In one example, an initialization phase may be required in order to obtain a first consistent point in time. This can be performed by reading and sending the entire production volume as IOs. Once this is achieved in the metadata stream and the data bucket, the continuous replication discussed herein can be performed. Thus, the first point in time that the system can roll back to is the first consistent point in time associated with the initialization process. This is an example of a replica production volume to which the metadata volume is applied. In another example, the initialized production volume may be updated from periodically.

To conserve space, the data stored in the data bucket may be consolidated. This may reduce the granularity of the points-in-time in the past, but may conserve space. A consolidation window can be defined and data within that window can be consolidated.

Figure 7:
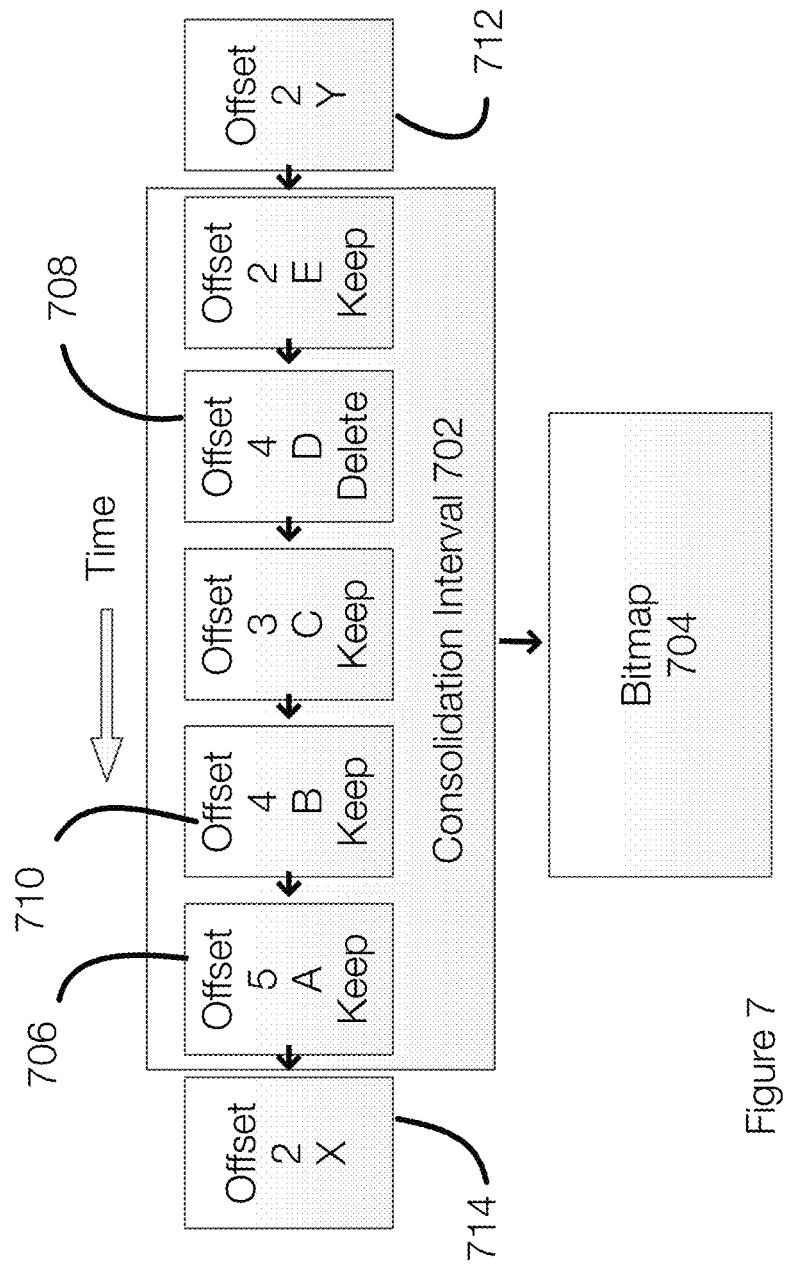
FIG. 7 illustrates an example of consolidating data in a replication system.

FIG. 7 illustrates an example of consolidation. FIG. 7 illustrates a consolidation interval 702 or window in which data is consolidated. In FIG. 7 the most recent end of the consolidation interval 702 is on the left. During consolidation, a bitmap may be created. Each bit in the bitmap may correspond to an offset in the production volume. Moving backwards, with respect to time, through the consolidation interval 702, a bit is set for each IO metadata encountered if the bit is not set. If the bit is already set, then the corresponding IO can be deleted. In particular, the IO metadata entry can be deleted from the metadata stream and the data can be deleted from the data bucket.

The consolidation interval shown in FIG. 7 includes 5 entries. The consolidation interval 702 can have varying sizes and scope. Further, the consolidation interval 702 may be associated with different time periods. For example, the consolidation interval 702 may be applied to entries that are a month old or the like.

In this example, the entries are evaluated beginning with the most recent. The most recent entry 706 in the consolidation interval 702 references offset 5. Thus, the corresponding bit in the bitmap 704 is set. Moving from IO A to IO C in the consolidation interval 702, the bits for offsets 5, 4, and 3 are set. When the entry 708 is encountered, the entry 708 (and the corresponding data) are deleted because the bit for offset 4 is already set when the entry 710 was encountered. The entries 712 and 714 are outside of the consolidation interval 702 and are therefore kept.

In one example, limiting the history to a predetermined protection window can keep the size of any replica disks under a required limit if necessary. In continuous replication, the protection window is often defined in terms of time. Thus, the consolidation window may be applied to the tail of the metadata stream. The data may be consolidated periodically.

In another example, the data in the data bucket may be deduplicated. For example, a map of hashes of the objects may be maintained so that chunks or objects are only stored once if possible. A new IO metadata in the metadata stream will point to an existing object or chunk that is already in the data bucket. In addition, garbage collection may be performed periodically to remove chunks that are not used by any IOs or entries in the metadata stream.

Deduplicating in this manner not only reduces the usage of the data bucket, but also reduces communication overhead. Deduplicated data is not transmitted. This reduced bandwidth requirements and improves RPO.

Using continuous replication to the cloud as discussed herein, an RPO of a few seconds (or lower) can be achieved. Further, the granularity is at the IO level. Thus, a production volume can be restored to any point in time. Further, by keeping the data and the metadata as objects allows less expensive storage to be used. More expensive storage such as Tier 1 storage may only be required when a restore is required.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for replicating data, the method comprising:
capturing transactions occurring on production data, wherein the transactions relate to changes in the production data;
transmitting data associated with the transactions to a remote storage as objects such that the production data can be replicated from the objects;
generating a metadata stream associated with the transactions, wherein each entry in the metadata stream corresponds to a transaction; and
storing the metadata stream in a metadata storage, wherein the production data is continuously replicated without maintaining a replica volume in the remote storage.

2. The method of claim 1, wherein the transactions include at least one of writes and deletes.

3. The method of claim 1, further comprising chunking the data into objects.

4. The method of claim 3, wherein each of the objects has a predetermined size.

5. The method of claim 3, wherein each object is associated with an offset in the production data and each object is associated with an identifier that uniquely identifies the object.

6. The method of claim 1, further comprising consolidating the metadata stream and the objects using a consolidation interval.

7. The method of claim 1, further comprising rehydrating the production data from the objects and the metadata stream.

8. The method of claim 1, further comprising storing an initial production copy in the remote storage.

9. A non-transitory computer readable medium comprising instructions that, when executed by a processor, perform the method of claim 1.

10. A method for rehydrating a production volume, the method comprising:
creating a blank metadata volume in preparation for rehydrating the production volume;
selecting a point in time in a metadata stream that corresponds to a restore point;
accessing the metadata stream and writing entries in the metadata stream to the blank metadata volume, wherein each entry includes an offset of an identifier of an object, wherein the identifier is written to a location in the blank metadata volume corresponding to the offset in the entry to prepare an organized metadata volume;
generating the production volume from the organized metadata volume and data stored in a remote storage, wherein objects in the remote storage corresponding to the identifiers stored in the organized metadata volume are written to corresponding offsets in the production volume.

11. The method of claim 10, wherein the generated production volume is a replica of an original production volume.

12. The method of claim 10, further comprising selecting a point in time for the production volume, wherein the point in time corresponds to a particular entry in the metadata stream.

13. The method of claim 10, wherein the production volume includes initialized production data.

14. The method of claim 13, wherein the objects in the remote storage are written to the initialized production data in the production volume.

15. The method of claim 10, wherein the organized metadata volume is prepared one entry at a time and wherein unnecessary writes are avoided.

16. The method of claim 10, wherein the objects in the remote storage are deduplicated.

17. A non-transitory computer readable medium comprising instructions that, when executed, perform the method of claim 10.

* * * * *